United States Patent
Moetakef et al.

(10) Patent No.: US 9,442,034 B2
(45) Date of Patent: Sep. 13, 2016

(54) ENGINE KNOCK SIGNAL TRANSMISSIVE ELEMENT

(71) Applicant: Ford Global Technologies, LLC, Dearborn, MI (US)

(72) Inventors: Mohammad Ali Moetakef, West Bloomfield, MI (US); James Matthew Kindree, South Lyon, MI (US); Mathew Leonard Hintzen, Stockbridge, MI (US); Antony George Schepak, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 362 days.

(21) Appl. No.: 14/087,820

(22) Filed: Nov. 22, 2013

(65) Prior Publication Data

US 2015/0149066 A1 May 28, 2015

(51) Int. Cl.
*G01L 23/22* (2006.01)
*F02B 77/08* (2006.01)
*F02F 1/10* (2006.01)

(52) U.S. Cl.
CPC ........... *G01L 23/221* (2013.01); *F02B 77/085* (2013.01); *F02F 1/108* (2013.01)

(58) Field of Classification Search
CPC ..................... Y10T 29/49231; Y10T 29/4927; Y10T 29/49272; F01P 2003/021; F02F 1/102; F02F 1/14; F02F 2001/104; F02F 2001/106; F02F 1/10; F02F 1/108; F02F 1/16; F02F 1/163; F02F 1/166
USPC .......... 701/111; 123/406.16, 406.21, 406.29, 123/406.34, 406.37–406.39, 41.72, 41.74, 123/41.79, 41.8, 41.81, 41.82 R, 41.83, 123/41.84; 277/591; 29/888.06, 888.061; 73/35.09, 35.12
See application file for complete search history.

(56) References Cited

U.S. PATENT DOCUMENTS

| | | | | |
|---|---|---|---|---|
| 4,468,950 A | * | 9/1984 | Ishigami | F02B 77/085 73/35.09 |
| 4,683,844 A | | 8/1987 | Arai et al. | |
| 5,131,357 A | * | 7/1992 | Inoue | F02F 7/0012 123/195 H |
| 6,406,032 B1 | * | 6/2002 | Miyaoh | F16J 15/0825 277/594 |
| 7,286,094 B2 | * | 10/2007 | Ratni | H01Q 9/28 343/772 |
| 8,091,518 B2 | | 1/2012 | Shikida et al. | |
| 2004/0237917 A1 | * | 12/2004 | Yasui | F01L 1/022 123/90.15 |

(Continued)

FOREIGN PATENT DOCUMENTS

JP 2009121346 A * 6/2009

OTHER PUBLICATIONS

Jan. 5, 2015 JP 2009-121346 English Machine Translation.pdf.*

*Primary Examiner* — Erick Solis
*Assistant Examiner* — Carl Staubach
(74) *Attorney, Agent, or Firm* — Julia Voutyras; Alleman Hall McCoy Russell & Tuttle LLP (57) ABSTRACT

Embodiments may provide an engine knock monitoring system that may include an engine block including an engine block body and a cylinder wall defining at least a portion of a combustion chamber. A space may be defined between a top of the cylinder wall and a top of the engine block body. An engine knock sensor may be mounted to the engine block. A pressure pulse transmissive element may be disposed in the space and may be disposed in contact with an outside surface of the cylinder wall and an opposite inside surface of the engine block body.

20 Claims, 3 Drawing Sheets

(56) References Cited

U.S. PATENT DOCUMENTS

| | | | | |
|---|---|---|---|---|
| 2005/0076860 A1* | 4/2005 | Tomita | ............... | F01P 11/04 123/41.74 |
| 2005/0263111 A1* | 12/2005 | Satou | ............... | F02F 1/108 123/41.74 |
| 2010/0050433 A1 | 3/2010 | Harada et al. | | |
| 2010/0275870 A1* | 11/2010 | Kameda | ............... | H01T 13/32 123/169 EL |
| 2013/0340217 A1* | 12/2013 | Madrigal | ............... | A62B 35/0068 24/583.1 |

* cited by examiner

ENGINE KNOCK SIGNAL TRANSMISSIVE ELEMENT

FIELD

The present application relates to engine knock detection in an open-deck design engine block wherein engine knock impulse pressure may be more efficiently transmitted to an engine knock sensor.

BACKGROUND AND SUMMARY

Engine designs may include various features that serve various purposes. One example may be open-deck engine block design wherein a space is left between the cylinders and the main body of the engine block. Open-deck advantages may include lower cost, use of high-strength aluminum alloys, thinner block casting sections, better cooling, lighter weight, and easier removal of the die from the mold when the block is die cast.

Another example engine design feature may be to provide an engine knock sensor coupled with an engine controller. When engine timing is too far advanced knocking, or pinging, may occur, but when the timing is too far retarded performance may be compromised. A knock sensor may be used to cause the engine to run with the ignition timing as far advanced as possible but without knocking. An engine controller may advance the timing until the knock sensor detects knocking. Then the controller may retard the ignition timing just enough for the knocking, or pinging, to stop. In addition, or alternatively, with turbocharged engines, the controller may send signals to a wastegate to lower turbo boost pressure until the knocking subsides.

The inventors herein have recognized a problem with knock sensor effectiveness when used with open-deck design engine blocks. Since knocking may occur when the piston is a few degrees from the TDC position, it may be helpful to have the knock sensor as close as possible to the top portion of the cylinder where the knock occurs. But the open space around the cylinders in an open-deck block may create a longer path for the knock, or pressure, signal to travel. Additional damping from traveling longer may weaken the signals and may increase the noise to signal ratio.

Modifications to the open space around the cylinders in open-deck engine blocks have been proposed. For example U.S. Patent Publication 20100050433 provides a processing method, and processing jig for cylinder blocks to avoid deterioration in the cylinder bore circularity during processing. The jig includes pressing members having wedge surfaces containing pressing portions to press on an outside of the cylinder wall from within the open space while finish processing is performed within the cylinder bore on the opposite side of the cylinder wall.

The inventors herein have recognized a number of shortcomings with this approach, for example, the pressing members are only effective as a countering force during cylinder block processing, and not during engine operation. The reference fails to address the shortcomings of the elongated signal path taken by knock signals due to the open space around the cylinders as recognized by the inventors herein.

Embodiments in accordance with the present disclosure may provide bridging to the open space between the cylinder and the side wall of the engine block which may also be in close proximity to the cylinder head and to the decking surface. In this way the knock signal path is made much shorter. In this way signal integrity and improved engine control may be accomplished.

Embodiments in accordance with the present disclosure may provide an engine knock monitoring system that may include an engine block including an engine block body and a cylinder wall defining at least a portion of a combustion chamber. A space may be defined between a top of the cylinder wall and a top of the engine block body. An engine knock sensor may be mounted to the engine block. A pressure pulse transmissive element may be disposed in the space and may be disposed in contact with an outside surface of the cylinder wall and an opposite inside surface of the engine block body. In this way, pulses of pressure, from engine knocking may be effectively transmitted from the cylinder wall to the engine block body to be sensed by the engine knock sensor.

Other example embodiments may provide a system for an engine. The system may include an open deck design engine block including: an engine block body, a cavity in the engine block body, a cylinder wall disposed within the cavity coupled at a first side thereof to a cavity base and extending from the cavity base to a second side, the cylinder wall may define at least part of a combustion chamber on an inside thereof. A space may be located between the cylinder wall and the second side of the engine block body. An engine knock sensor may be coupled with the engine block body, and a knock impact transmissive block may be secured in the space. In this way, the space may not cause any impact signal delay or degradation.

Other example embodiments may include an engine knock signal transmissive element that may include a substantially solid block sized and shaped to fit within a space between a cylinder wall of a combustion chamber and a body of an engine block. To fit in the space the block may have a first side that conforms to the shape of a first contour located on the outside surface of the cylinder wall, and a second side that conforms to the shape of a second contour located on the inside surface of the engine block. In this way, the engine knock signal transmissive element may be used to facilitate efficient transmission of engine knock signals from a combustion chamber to a knock sensor.

It is understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
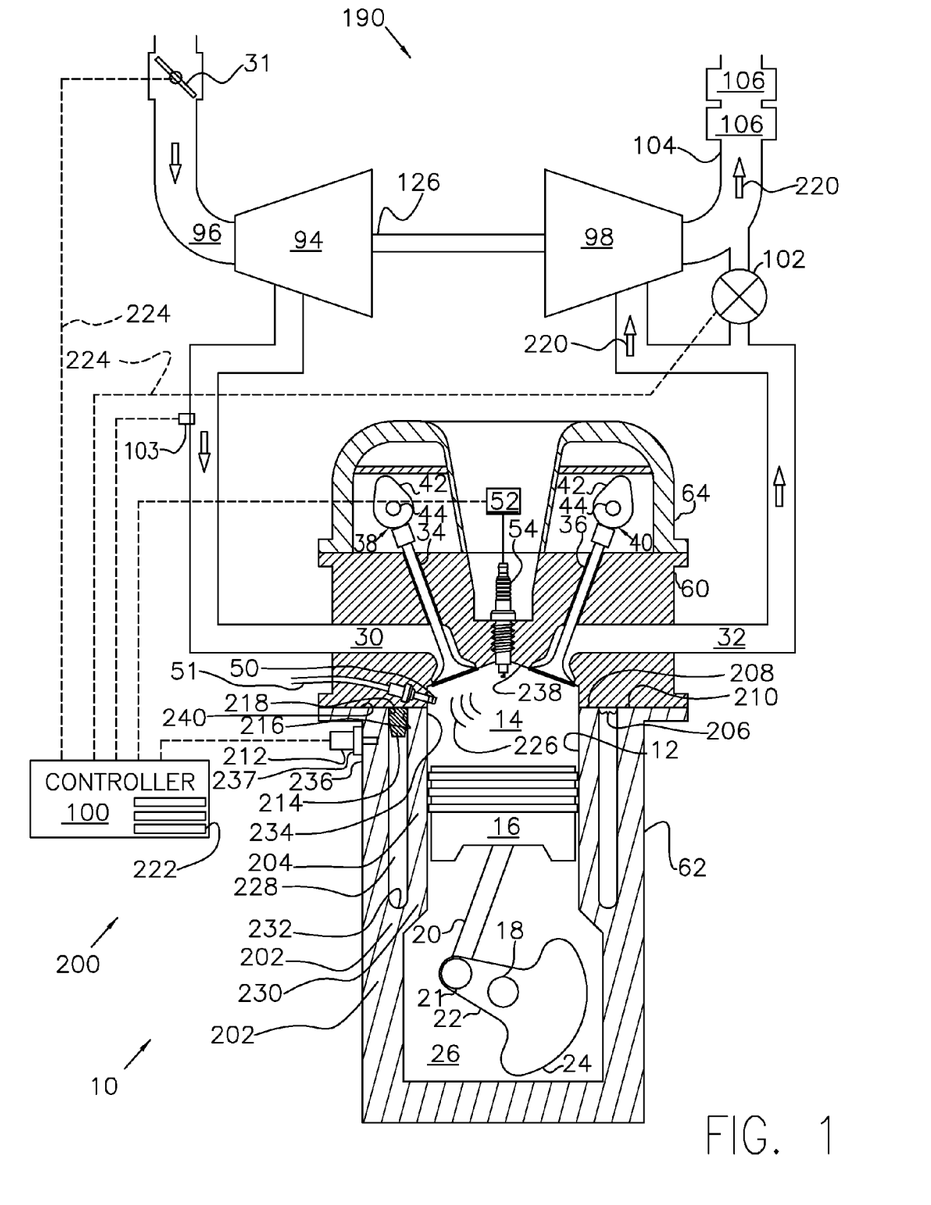
FIG. 1 is a schematic diagram of an example engine system in accordance with the present disclosure.

FIG. 1 is a cross-sectional diagram with schematic portions, illustrating a cross-section of an engine 10 in accordance with the present disclosure. FIGS. 2, 3, 4, and 5 show different views of the engine block body 202, cylinder walls 204, and engine block deck 240 together with the engine knock signal transmissive elements 214. In one embodiment, the transmissive element may include a substantially solid block 215 shaped to fit in a space. The block 215 is shown in FIG. 6.

In FIG. 1, various features of the engine 10 may be omitted, or illustrated in a simplified fashion for ease of understanding of the current description. For example, areas may be illustrated with continuous cross hatching that may otherwise indicate a solid body, however actual embodiments may include various engine components, and/or hollow, or empty, portions of the engine.

The cross-sectional view shown in FIG. 1 may be considered taken through one cylinder 12 of the engine 10. Various components of the engine 10 may be controlled at least partially by a control system that may include a controller 100, and/or by input from a vehicle operator via an input device such as an accelerator pedal (not shown). The cylinder 12 may include a combustion chamber 14. A piston 16 may be positioned within the cylinder 12 for reciprocating movement therein. The piston 16 may be coupled to a crankshaft 18 via a connecting rod 20, a crank pin 21, and a crank throw 22 shown here combined with a counterweight 24. Some examples may include a discrete crank throw 22 and counterweight 24. The reciprocating motion of the piston 16 may be translated into rotational motion of the crankshaft 18. The crankshaft 18, connecting rod 20, crank pin 21, crank throw 22, and counterweight 24, and possibly other elements not illustrated may be housed in a crankcase 26. The crankcase 26 may hold oil. Crankshaft 18 may be coupled to at least one drive wheel (not shown) of a vehicle via an intermediate transmission system. Further, a starter motor may be coupled to crankshaft 18 via a flywheel to enable a starting operation of engine 10. The drive wheel, or wheels, may be in rolling contact with a drive surface. The wheel(s) may include a braking system that when applied may slow or stop the wheels from rotation. In addition the action of the engine 10, in addition to providing a motive force to effect movement, may provide a braking, or retarding force to slow, or stop the wheel(s) from rotating.

Combustion chamber 14 may receive intake air from an intake passage 30, and may exhaust combustion gases via exhaust passage 32. Intake passage 30 and exhaust passage 32 may selectively communicate with combustion chamber 14 via respective intake valve 34 and exhaust valve 36. A throttle 31 may be included to control an amount of air that may pass through the intake passage 30. In some embodiments, combustion chamber 14 may include two or more intake valves and/or two or more exhaust valves.

In this example, intake valve 34 and exhaust valve 36 may be controlled by cam actuation via respective cam actuation systems 38 and 40. Cam actuation systems 38 and 40 may each include one or more cams 42 and may utilize one or more of cam profile switching (CPS), variable cam timing (VCT), variable valve timing (VVT) and/or variable valve lift (VVL) systems that may be operated by the controller to vary valve operation. The cams 42 may be configured to rotate on respective revolving camshafts 44. As depicted, the camshafts 44 may be in a double overhead camshaft (DOHC) configuration, although alternate configurations may also be possible. The position of intake valve 34 and exhaust valve 36 may be determined by position sensors (not shown). In alternative embodiments, intake valve 34 and/or exhaust valve 36 may be controlled by electric valve actuation. For example, cylinder 12 may include an intake valve controlled via electric valve actuation and an exhaust valve controlled via cam actuation including CPS and/or VCT systems.

In one embodiment, twin independent VCT may be used on each bank of a V-engine. For example, in one bank of the V, the cylinder may have an independently adjustable intake cam and exhaust cam, where the cam timing of each of the intake and exhaust cams may be independently adjusted relative to crankshaft timing.

Fuel injector 50 is shown coupled directly to combustion chamber 14 for injecting fuel directly therein in proportion to a pulse width of a signal that may be received from the controller 100. In this manner, fuel injector 50 may provide what is known as direct injection of fuel into combustion chamber 14. The fuel injector 50 may be mounted in the side of the combustion chamber 14 or in the top of the combustion chamber 14, for example. Fuel may be delivered via fuel line 51 to fuel injector 50 by a fuel system that may include a fuel tank, a fuel pump, and a fuel rail (not shown). In some embodiments, combustion chamber 14 may alternatively or additionally include a fuel injector arranged in intake passage 30 in a configuration that provides what is known as port injection of fuel into the intake port upstream of combustion chamber 14. The fuel line 51 may be a hose, or passage which may be coupled to a mating engine component, such as cylinder head 60.

Ignition system 52 may provide an ignition spark to combustion chamber 14 via spark plug 54 in response to a spark advance signal from the controller, under select operating modes. Though spark ignition components are shown, in some embodiments the combustion chamber 14 or one or more other combustion chambers of engine 10 may be operated in a compression ignition mode, with or without an ignition spark.

Cylinder head 60 may be coupled to a cylinder block or engine block 62. The cylinder head 60 may be configured to operatively house, and/or support, the intake valve(s) 34, the exhaust valve(s) 36, the associated valve actuation systems 38 and 40, and the like. Cylinder head 60 may also support the camshafts 44. A cam cover 64 may be coupled with and/or mounted on the cylinder head 60 and may house the associated valve actuation systems 38 and 40, and the like. Other components, such as spark plug 54 may also be housed and/or supported by the cylinder head 60. A cylinder block, or engine block 62, may be configured to house the piston 16. In one example, cylinder head 60 may correspond to a cylinder 12 located at a first end of the engine. While FIG. 1 shows one cylinder 12 of a multi-cylinder engine 10, each cylinder 12 may similarly include its own set of intake/exhaust valves, fuel injector, spark plug, etc.

The engine 10 may include a turbocharger 190 having a turbo compressor 94 disposed on an induction air path 96 for compressing an induction fluid before the induction fluid is passed to the intake passage 30 of the engine 10. In some applications, an inter-cooler (not shown) may be included to cool the intake charge before it enters the engine. The turbo compressor 94 may be driven by an exhaust turbine 98 which may be driven by exhaust gasses leaving the exhaust manifold 32. In some cases, the throttle 31 may be downstream from the turbo compressor 94 instead of upstream as illustrated. The turbo compressor 94 may be coupled for rotation with the exhaust turbine 98 via a turbine shaft 126. The turbine shaft 126 may be supported for rotation by turbine bearings (not shown), and may be lubricated with a turbine bearing lubrication system. Although not illustrated, the engine 10 may include an exhaust gas recirculation EGR line and/or EGR system.

The flow of exhaust gasses through the exhaust turbine 98 may be regulated, or controlled by, for example, a wastegate 102 configured to divert exhaust gases away from the exhaust turbine 98 and to an exhaust line 104. Diverting the exhaust gases may help regulate the speed of the exhaust turbine 98 which in turn may regulate the rotating speed of the turbo compressor 94. The wastegate 102 may be configured as a valve. The wastegate 102 may be used to regulate, for example, a boost pressure in the turbocharger system, which may help protect the engine and the turbocharger. The wastegate 102 may be actuated based on signals received from the controller 100.

The exhaust line 104 may include one or more emission control devices 106, which may be mounted in a close-coupled position in the exhaust line 104. The one or more emission control devices 106 may include, for example, a three-way catalyst, lean NOx trap, diesel particulate filter, oxidation catalyst, etc.

Embodiments may provide an engine knock monitoring system 200 that may include an engine block 62. The engine block 62 may include an engine block body 202 and a cylinder wall 204 defining at least a portion of the combustion chamber 14. A space 206 may be defined between a top of the cylinder wall 208 and a top of the engine block body 210. An engine knock sensor 212 may be mounted to the engine block 62. A pressure pulse transmissive element 214 may be disposed in the space 206 and may be disposed in contact with an outside surface 216 of the cylinder wall 204 and an opposite inside surface 218 of the engine block body.

The engine knock monitoring system 200 may also include an ignition control mechanism 52, such as ignition system 52, to control timing of combustion of an air/fuel mixture within the combustion chamber 14. The controller 100 may be operatively coupled with the ignition control mechanism 52, and may also be operatively coupled with the engine knock sensor 212. The controller 100 may also be configured to adjust the timing of the combustion when the engine knock sensor 212 senses a knock signal, such as a pinging, or characteristic pressure change, that may be outside a preselected range.

Embodiments may provide an engine knock monitoring system 200 may also include an ignition control mechanism 52 to control timing of combustion of an air/fuel mixture within the combustion chamber 14. A wastegate valve 102 may be configured to control an exhaust flow 220 through the exhaust turbine 98 in order to control a boost pressure of intake air directed to the combustion chamber 14. The controller 100 operatively coupled with the ignition control mechanism and with the engine knock sensor 212 and configured to adjust the timing of the combustion via the ignition control mechanism 52, and/or the wastegate 102 when the engine knock sensor 212 senses a knock signal that is outside a preselected range. Operation of the wastegate 102 may also depend on signals received from pressure sensor 103 that may be coupled with the intake passage 30. The pressure sensor 103 may send signals to the controller 100.

Embodiments may provide an engine knock monitoring system 200 that may also include a controller 100. The controller 100 may have one or more logic circuits 222 and one or more control couplings 224 to adjust engine conditions toward a predetermined state in accordance with signals received from the engine knock sensor 212 via the pressure pulse transmissive element 214.

Embodiments may provide an engine knock monitoring system 200 wherein sound waves 226 from the combustion chamber 14 may be transmitted through the engine block 62 at a first speed, and wherein sound waves are transmitted through the pressure pulse transmissive element 214 at a second speed, wherein the second speed is substantially the same as the first speed.

Various embodiments may provide a system 200 for an engine 10. The system 200 may include an open deck design engine block 62. The open deck design engine block 62 may include an engine block body 202, and a cavity 228 in the engine block body 202. A cylinder wall 204 may be disposed within the cavity 228, and may be coupled at a first side 230 thereof to a cavity base 232 and extending from the cavity base 232 to a second side 234. The cylinder wall 204 may define at least part of a combustion chamber 14 on an inside thereof. A space 206 may be located between the cylinder wall 204 and the second side 234 of the engine block body 202. An engine knock sensor 212 may be coupled with the engine block body 202. A knock impact transmissive block 214 may be secured in the space 206. In this way, knock impacts that may originate from inside the combustion chamber 14 may be transmitted across the space 206 and may be sensed by the engine knock sensor 212.

The engine knock sensor 212 may be fixed to an exterior surface 236 of the engine block body, and may be mounted to a mounting surface 237. As seen in the FIGS. 1 and 3 configurations, the sensor mounting surface 237 is positioned such that the knock sensor 212 may be mounted perpendicularly to the exterior surface 236 of the engine block body. Furthermore, in this position the sensor is also perpendicular to the center (vertical) axis of the transmissive block 214. The sensor may be mounted on the engine block body exterior surface 236 such that the distance between the sensor and transmissive block is reduced.

In another embodiment, the sensor 212 may be fixed near, or opposite a top end 238 of the combustion chamber 14. If the engine knock sensor 212 were not mounted to the surface 237, the blocks 214 may be moved so as to reduce the distance between the blocks and knock sensor, ensuring the knock signal path is also reduced to maintain signal integrity.

The system 200 may also include a controller 100 operatively coupled with the engine knock sensor 212 and operatively coupled with an ignition control mechanism 52 to adjust timing of combustion within the combustion chamber 14 in order to regulate engine knock to below a predetermined threshold.

The engine block body 202 and the cylinder wall 204 may be made from a first material, and the knock impact transmissive block 214 may be made from a second material. The first material and the second material may be the same or substantially the same material. In this way, some or all characteristics of each material may be the same, or similar, for example, they may have similar densities. In some cases the pressure pulse transmissive element 214 may be a weld. In other cases it may be a block or a wedged sized and shaped to fit into the space 206.

In this way impact forces, for example noises, may be transmitted therethrough in similar ways, for example at the same, or similar velocities. In some examples one or more knock impact transmissive blocks 214 may have a shrink fit relationship with the cavity 206, such that they may be shrink fitted into the cavity 206. In this way a substantially homogeneous and continuous path of material and an uninterrupted path for a knock signal may be provided. It is understood that a shrink fit is a technique that achieves an interference or press fit in which the fastening between the transmissive blocks 214, cylinder wall 204, and engine block body 202 is attained through friction between the parts. In particular, the compressive forces between the parts created by the shrink fit allows for a rigid connection, wherein the transmissive element 214 cannot substantially move in any direction or substantially rotate about any axis. The relative tightness of the block in the space 206 is determined by the degree of interference, or how much larger the block is than the space 206. The desired tightness of the fit may depend on factors such as engine vibration intensity, engine block material, transmissive element material, cylinder wall thicknesses, etc. The shrink fit fastening method reduces the complexity of the block arrangement because no conventional fasteners are required.

In the case of the transmissive element 214 being a weld, the space 206 may be small enough to accommodate a weld to make the implementation of the transmissive element more economical. In another situation, shrink fitting the transmissive element may be difficult or impossible due to the engine block design, thereby requiring a weld to bridge the space 206 and provide a path for the knock signal. In the following embodiment, the transmissive element will be described as a physical block 215 of material.

The system 200 may include an engine block deck 240 that may be used for, or configured to be coupled with, another engine component, for example a valve cover, or cam cover 64. The engine knock sensor 212 may be coupled to an outside surface 236 of the engine block body 202 substantially adjacent to the engine block deck 240. In some cases the knock impact transmissive block 214 may be installed at, or coupled with a mounting surface 237.

Various embodiments may provide an engine knock signal transmissive element 214 that may include a substantially solid block 215 sized and shaped to fit within a space 206 between a cylinder wall 204 of a combustion chamber 14 and a body 240 of an engine block 62. The substantially solid block 215 may be made from a material which is the same or substantially similar to a material from which the engine block is made. For example, the substantially solid block 215 may be made from aluminum, or other material, such as steel and the like, that may or may not have characteristics similar to the cylinder wall 204 and the body 240 of the engine block 62. An engine knock sensor 212 may be coupled with the body 202 of the engine block 62 to sense if an engine knock occurs within the combustion chamber 14.

In one example embodiment as shown in FIG. 6, the general shape of the transmissive block 214 is an irregular convex octagonal prism with non-equal side lengths. The top surface 217 of the block comprises an octagonal shape, where four of the eight edges are equal in length, perpendicular, and not in connection with one another. Bridging the space between the four perpendicular edges are four additional angled edges that are shorter in length. The surface shape is similar to the shape of a conventional traffic stop sign, but with the four horizontal and vertical edges extended in length.

The bottom surface 219 of the block also comprises the same octagonal shape as the top surface, but smaller in size. The bottom surface is located a distance away from the top surface, the two surfaces are parallel, and the surfaces share a common center axis that is orthogonal to the planes of each of the surfaces. Between the surfaces lies the rest of the block material, filling the space in a linear manner so cross-sections of the prism vary in size ranging from the smaller bottom surface linearly to the larger top surface. According to this embodiment of the transmissive element, the block roughly resembles a plug or wedge. As illustrated, two side surfaces are in face-sharing engagement with internal side walls of a coolant passage (cavity 228) for an open deck engine block design, whereas two different side walls and a bottom 219 are open to contact coolant in the coolant passage, with a top surface 217 flush with a top surface of the engine block 210.

The relative size between the top and bottom surfaces of the blocks may be determined by the contours (252 and 258) of the specific cylinder wall 204 and engine block body 202. In this way the wedge shape of the block may be more elongated or shorter according to the contours.

It is noted that the present description of the shape of the transmissive element 214 will be considered in an exemplary and non-limiting manner. The block 214 may exhibit a number of shapes and forms depending upon the specific open deck design of the engine block. Since the purpose of the transmissive block 214 is to bridge the space 206 between the outside surface 216 of the cylinder wall 204 and the inside surface 218 of the engine block body 202, it is understood that multiple block forms can be created to reduce the length of the knock signal path. In one alternative embodiment, the block 214 may acquire a longer profile such that the side of the block in contact with the cylinder wall 204 has more curvature to allow the block to follow the curvature of the cylinder wall.

In the present embodiment, the substantially solid, wedge-shaped block may be able to be wedged into the space 206 between the cylinder wall and the body 202 of the engine block 62. With some embodiments the substantially solid block 215 may include a first side 250 shaped to substantially match a first contour 252 located on an outside surface 254 of the cylinder wall 204. The substantially solid block 215 may also include and a second side 256 opposite the first side 250 shaped to substantially match a second contour 258 located on an inside surface 260 of the space 206 defined by a radially outside portion of the body 202 of the engine block 62. The cylinder wall 204 and/or the engine block body 202 may have a notched portion 262 shaped to receive the pressure pulse transmissive element 214. In another case, the first side 250 may be curved to substantially match a radial portion 254 of the outside surface of the cylinder wall 204. Similarly, the second side 256 may be curved to substantially match an annular portion of the inside surface 260 of the outside portion of the body of the engine block body 202. It is understood that the transmissive element 214 and mating surfaces will have one or more contours and notches to enable a secure fit. Due to this geometric constraint, the element may take on multiple forms depending upon the shape of the cylinder wall and engine block wall.

Figure 4:
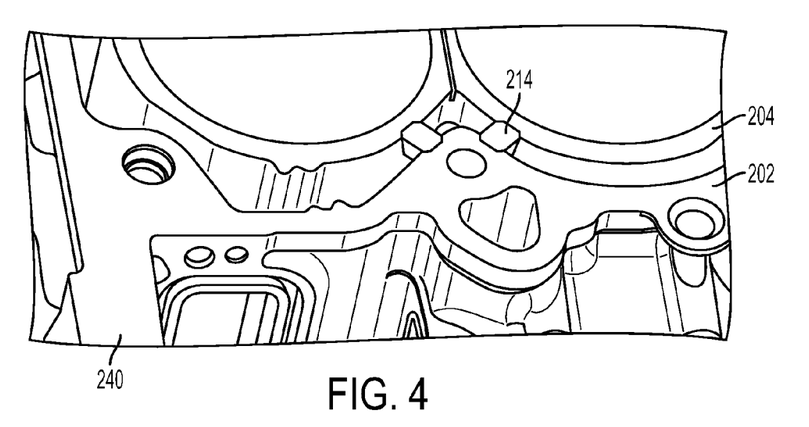
FIG. 4 is a top perspective view of another example open deck design engine block including knock signal transmissive blocks installed in accordance with the present disclosure.

As seen in FIG. 4, the top surface of the transmissive element 214 is aligned with the top surface of the cylinder wall 208 and top surface of the engine block 210. The element may be positioned slightly below the top surface of the cylinder wall, but cannot be positioned above the plane defined by the top surfaces of the cylinder wall and engine block. The reason for this is that the cylinder head 60 joins the cylinder wall and engine block along mating surfaces that are well-aligned and flat. The alignment of the top surface of the transmissive block 214 implies that the block is positioned in a vertical manner according to the cylinder orientation, evident in FIG. 5. Particularly, the aforementioned common center axis of the block is parallel to the axial direction of the cylinder (its center axis). In this way angular planar misalignment between the top surface 217 of the block and the top surfaces of the cylinder wall 208 and engine block 210 will be reduced.

Figure 2:
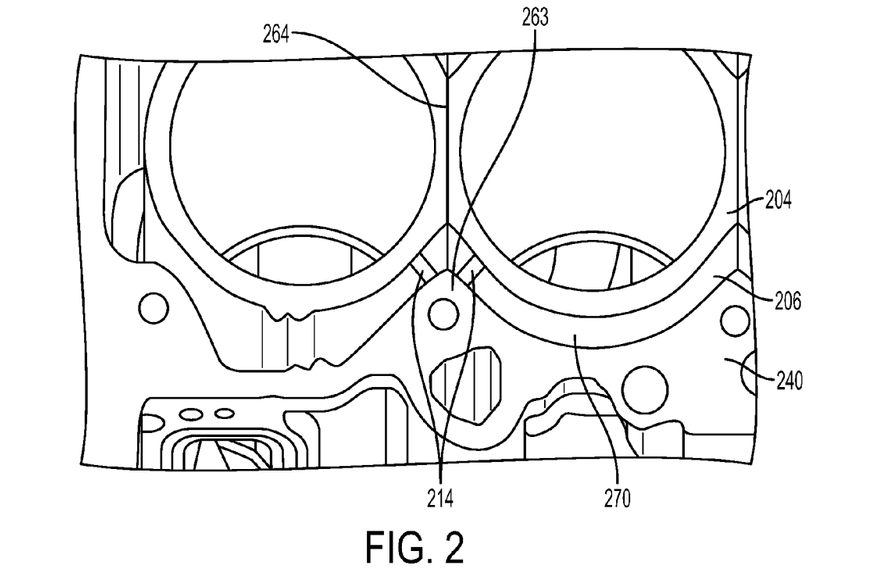
FIG. 2 is a top view of a portion of an example open deck design engine block that may be used in the system illustrated in FIG. 1.
Figure 5:
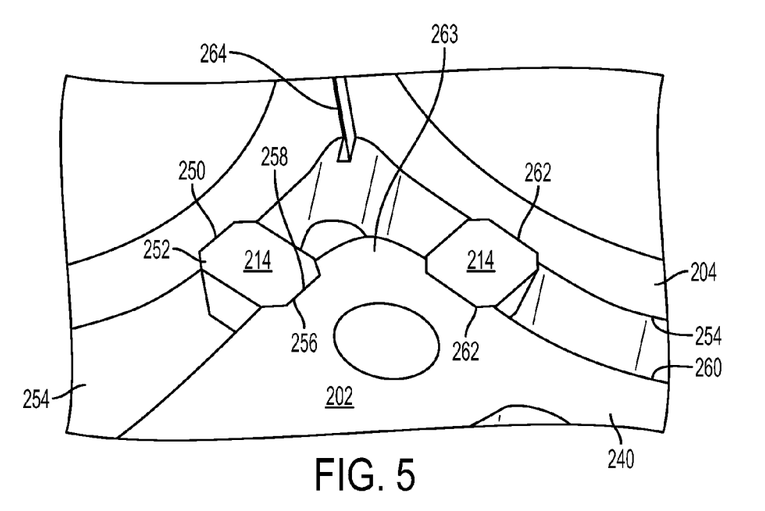
FIG. 5 is a detailed top perspective view similar to the view illustrated in FIG. 4.
Figure 6:
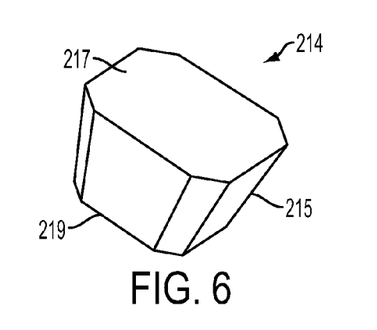
FIG. 6 is a perspective view of a single knock signal transmissive block.

As seen in the embodiments of FIGS. 2, 4, and 5, two transmissive blocks 214 are shown, each mounted to provide paths for knock signals from two separate cylinders. The blocks are positioned such that they are close together and between two adjacent cylinders. Hereafter the location of the blocks is described with relation to the engine block and cylinders. Shown in FIG. 2, the cylinder cavities defined by cylinder walls 204 have discrete thicknesses. The cylinder walls are surrounded by the engine block body 202, leaving a space 206 between the cylinder walls and engine block body. In the configuration shown in FIG. 2, the two cylinders are adjacent, connecting by a common wall. The engine block body 202 follows the contours of the cylinder wall 204 periphery such that where two cylinders meet the engine block body forms a rise 263 if one is viewing the engine block in a vertical direction. The rise 263 appears similar to a triangle, as seen in FIG. 2. The two transmissive blocks are mounted on either side of the apex of the triangle or rise 263, both equally distanced from the triangle apex. The inside and outside surfaces of the cylinder and engine block body (254 and 260) may include contours and notched portions, described previously, to hold the transmissive block 214 in place.

Referring to FIG. 5, the two blocks 214 are also symmetric about an axis defined by the groove 264 separating the two adjacent cylinders. The groove defines the region at which two adjacent cylinders meet in the displayed engine configuration. As can be seen, the aforementioned apex of the triangle lies along the same axis defined by the groove 264. The two transmissive blocks 214 are therefore symmetric about both the groove 264 and apex of the triangle 263.

Figure 3:
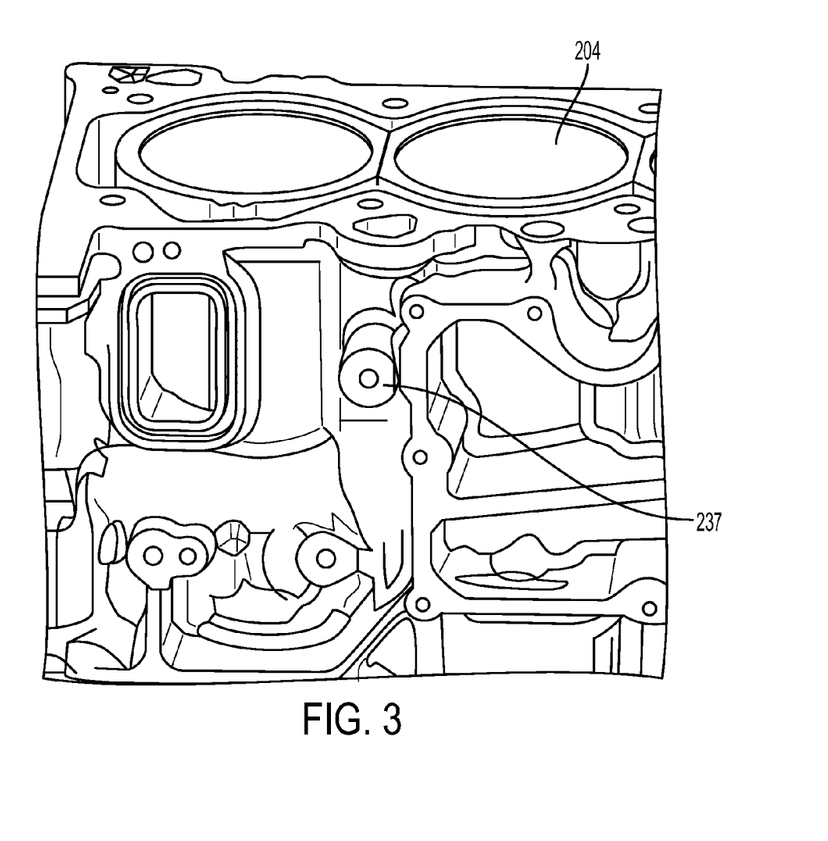
FIG. 3 is a front-top perspective view of the open deck design engine block shown in FIG. 2.

The two blocks shown in FIG. 2 are called a set, defined by the aforementioned symmetrical arrangement, or symmetrical mounting pattern. As shown in FIG. 3, two cylinders are fully displayed, wherein one set of blocks 214 is also displayed. This mounting pattern can be extended to a full engine. For example, in an inline six-cylinder (I6) engine there would be three sets of blocks, with each set corresponding to two cylinders and a block mounted to each cylinder. The engine knock sensor 212 may then receive knock signals from any of the six cylinders via the continuous path of material created by the transmissive blocks 214. One can see that this symmetrical block pattern may be applied to a multitude of engine arrangements, inline or otherwise.

It is understood that the arrangement pattern of the transmissive blocks can vary depending upon the engine block and cylinder design. The aforementioned symmetrical block mounting pattern may be changed to better suit a particular engine design. In a different example embodiment not shown in the figures, the blocks for each cylinder may be mounted such that one block for each cylinder is positioned at a location ninety degrees from the point at which two cylinders meet (the adjacent point). The block mounting location for this example embodiment is shown in FIG. 2 at 270.

It is noted that the particular position of the transmissive element 214 around the periphery of the cylinder wall 204 may also be determined by the size of the aforementioned space 206. In an engine system where the space 206 may vary substantially, the transmissive block may be mounted at a location where the space 206 is the smallest to reduce the size of the block and reduce the knock signal path length.

It is understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. An engine knock signal transmissive element comprising:
a substantially solid block sized and octagonally wedge-shaped to fit within a space between a cylinder wall of a combustion chamber and a body of an open deck engine block, the substantially solid block having a flat top surface flush with a top surface of the engine block.

2. The engine knock signal transmissive element of claim 1, wherein the substantially solid block is made from aluminum, the substantially solid block further having two side surfaces in face-sharing engagement with internal side walls of a coolant passage in the space.

3. The engine knock signal transmissive element of claim 1, wherein the substantially solid block is made from a material which is the same or substantially similar to a material from which the engine block is made, the substantially solid block further having two side walls and a bottom open to contact coolant in the space.

4. The engine knock signal transmissive element of claim 1, further comprising an engine knock sensor coupled with the body of the engine block to sense an engine knock that passes through the engine knock signal transmissive element.

5. The engine knock signal transmissive element of claim 1, further comprising an engine knock sensor coupled with the body of the engine block to sense if an engine knock occurs within the combustion chamber, wherein a shape of the substantially solid block is an irregular convex octagonal prism with non-equal side lengths, the top surface of the substantially solid block comprising an octagonal shape, where a first four of eight edges are equal in length, perpendicular, and not in connection with one another, and bridging a space between the first four perpendicular edges are four additional angled edges that are shorter in length than the first four.

6. The engine knock signal transmissive element of claim 1, wherein the substantially solid block includes a wedge shaped cross section such that the substantially solid block is able to be wedged into the space between the cylinder wall and the body of the engine block.

7. The engine knock signal transmissive element of claim 1, wherein the substantially solid block includes a first side shaped to substantially match a first contour located on an outside surface of the cylinder wall and a second side opposite the first side shaped to substantially match a second contour located on an inside surface of the space defined by a radially outside portion of the body of the engine block.

8. The engine knock signal transmissive element of claim 7, wherein the first side is curved to substantially match a radial portion of the outside surface of the cylinder wall, and wherein the second side is curved to substantially match an annular portion of the inside surface of the outside portion of the body of the engine block.

9. An engine knock monitoring system comprising:
an open deck engine block including an engine block body;
a cylinder wall defining at least a portion of a plurality of combustion chambers;
a coolant space between a top of the cylinder wall and a top of the engine block body;
an engine knock sensor mounted to the engine block; and
a plurality of pressure pulse wedge-shaped transmissive elements in the coolant space and disposed in contact with an outside surface of the cylinder wall and an opposite inside surface of the engine block body and having a top flat surface flush with a surface of the engine block, wherein two of the plurality of transmissive elements are mounted on either side of an apex of a triangle where two adjacent cylinders of a plurality of cylinders meet, both tramissive elements equally distanced from the triangle apex and positioned closer to a groove than an opposite side of the respective first and second cylinders.

10. The engine knock monitoring system of claim 9, further comprising an ignition control mechanism to control timing of combustion of an air/fuel mixture within the plurality of combustion chambers; and
a controller operatively coupled with the ignition control mechanism and with the engine knock sensor and configured to adjust the timing of the combustion when the engine knock sensor senses a knock signal that is outside a preselected range.

11. The engine knock monitoring system of claim 9, further comprising:
an ignition control mechanism to control timing of combustion of an air/fuel mixture within the plurality of combustion chambers;
a wastegate valve configured to control an exhaust flow through an exhaust turbine in order to control a boost pressure of intake air directed to the plurality of combustion chambers; and
a controller operatively coupled with the ignition control mechanism and with the engine knock sensor and configured to adjust the timing of the combustion and/or the wastegate valve when the engine knock sensor senses a knock signal that is outside a preselected range.

12. The engine knock monitoring system of claim 9, further comprising:
a controller;
the controller having one or more logic circuits and one or more control couplings to adjust engine conditions toward a predetermined state in accordance with signals received from the engine knock sensor via the plurality of pressure pulse wedge-shaped transmissive elements.

13. The engine knock monitoring system of claim 9, wherein sound waves from the plurality of combustion chambers are transmitted through the engine block at a first speed, and wherein sound waves are transmitted through the plurality of pressure pulse wedge-shaped transmissive elements at a second speed, wherein the second speed is substantially the same as the first speed.

14. The engine knock monitoring system of claim 9, wherein the plurality of pressure pulse wedge-shaped transmissive elements is a weld.

15. A system for an engine comprising:
an open deck design engine block including:
an engine block body,
a cavity in the engine block body,
a cylinder wall disposed within the cavity coupled at a first side thereof to a cavity base and extending from the cavity base to a second side, the cylinder wall defining at least part of first and second adjacent combustion chambers on an inside thereof,
a groove separating the two adjacent combustion chambers, the groove defining a region at which two adjacent cylinders meet,
a space between the cylinder wall and the second side of the engine block body,
an engine knock sensor coupled with the engine block body,
first and second knock impact transmissive wedge-shaped blocks secured in the space, each having a flat top surface flush with a top surface of the engine block, wherein the first and second knock impact transmissive wedge-shaped blocks are symmetric about the groove and positioned closer to the groove than an opposite side of the respective first and second cylinders, and having the top flat surface flush with the top surface of the engine block, wherein two transmissive elements are mounted on either side of an apex of a triangle where the two adjacent cylinders of a plurality of cylinders meet, the two tramissive elements equally distanced from the triangle apex and closer to where the cylinders meet than an opposite side of the respective cylinders.

16. The system for the engine of claim 15, wherein the engine knock sensor is fixed to an exterior surface of the engine block body.

17. The system for the engine of claim 15, further comprising a controller operatively coupled with the engine knock sensor and operatively coupled with an ignition control mechanism to adjust timing of combustion within the first and second adjacent combustion chambers in order to regulate engine knock to below a predetermined threshold.

18. The system for the engine of claim 15, wherein the engine block body and the cylinder wall are made from a first material and wherein the first and second knock impact transmissive wedge-shaped blocks are made from a second material and wherein the first material and the second material are the same or substantially the same material.

19. The system for the engine of claim 15, further comprising an engine block deck for coupling with a valve cover, and wherein the engine knock sensor is coupled to an outside surface of the engine block body substantially adjacent to the engine block deck.

20. The system for the engine of claim 15, wherein the first and second knock impact transmissive wedge-shaped blocks have a shrink fit relationship with the cavity.

* * * * *